Oct. 4, 1938.  R. W. ERDLE  2,131,940
DENTURE
Filed Jan. 20, 1936
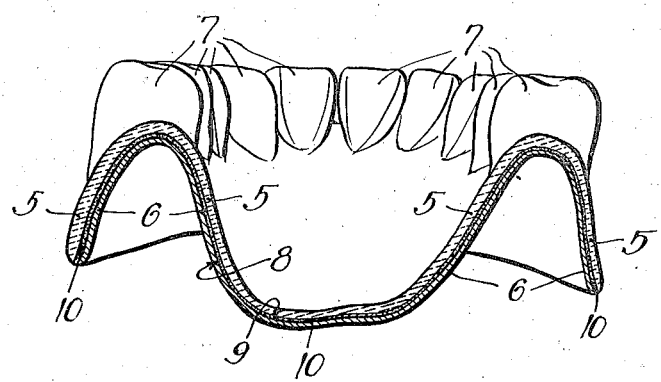
Inventor:
Reiner W. Erdle.

Patented Oct. 4, 1938

2,131,940

UNITED STATES PATENT OFFICE 2,131,940

DENTURE

Reiner W. Erdle, Chicago, Ill., assignor to Dental Research Corporation, a corporation of Illinois Application January 20, 1936, Serial No. 59,817

5 Claims. (Cl. 32—2)

This invention relates to dentures, and has to do with dental plates.

One of the objects of the invention is to produce a porcelain plate, either partial or full, with a metal base which is rigid, as measured by modulus of elasticity, is effective to support and strengthen the plate, and enables reducing the thickness of the porcelain part of the plate and thereby the over-all thickness of the plate. The rigid metal base and its attachment to the porcelain part of the plate also holds the porcelain part of the plate together in the event of fracture thereof, and enables perfect adaptation to the irregularities of contour and configuration which each specific case involves.

Further objects and advantages of the invention will be apparent from the following detailed description taken in connection with the accompanying drawing in which the single figure is a sectional view through a full upper denture embodying the present invention.

Referring to the drawing, the dental plate shown is of laminated construction, comprising a layer 5 of porcelain and a layer or metal base 6 of rigid material having a high modulus of elasticity. The metal forming the base 6 may be like that disclosed in Charles H. Prange Patent No. 1,958,446, dated May 15, 1934, or of any other suitable rigid material embodying a high degree of rigidity as measured by modulus of elasticity.

The porcelain layer or plate part 5 has porcelain teeth 7 which may be either stock teeth to which the plate part is molded, or teeth molded in one piece with the plate part 5. The rigid metal base is effective to strengthen the plate and enables reducing the thickness of the porcelain part of the plate and thereby the over-all thickness of the plate. Furthermore, this rigid metal base and its attachment to the porcelain part of the plate holds the porcelain part of the plate together in the event of fracture thereof, and enables perfect adaptation to the irregularities of contour and configuration which each specific case involves.

The metal base 6 may be cast or swaged by means of a die and counterdie to the contour and configuration required. The surface 8 of the porcelain plate part 5, which is molded to the desired contour and configuration as already described, conforms with the surface 9 of the metal base 6.

The metal base 6 is usually produced first when the metal plate is applied palately. Then by placing this base upon the original model I use this as the basis for forming up the wax pattern for the porcelain part.

The porcelain plate part 5 is made by adapting a wax pattern to a model and then setting up and articulating the teeth on the wax pattern. The teeth may be stock teeth formed of porcelain, or wax teeth may be used to form the porcelain teeth as a unitary part of the porcelain plate part 5.

The wax pattern is then attached to a sprue which is large enough to hold the amount of porcelain required to fill the mold. The sprue and wax pattern are coated with a material which will not combine with the fused porcelain and which, at the same time, will give the mold cavity a smooth finish. One satisfactory material may be formed by mixing powdered flint with a mixture of 50% of silicate of soda diluted 10:1 and 50% of a mixture of diluted di-glycol stearate. To 100 c. c. of this paste is added 1 c. c. of hydrochloric acid to effect the setting of this paste. This paste is sprayed to, or otherwise applied as a coating on the wax pattern. Potassium carbonate may be used with this material up to 10% with desired results. When this coating is applied the water evaporates and leaves a coating which will not combine with the fused porcelain, and which, at the same time, gives the mold cavity a smooth finish which cannot be obtained with the rough outer investment material. It is thought that this coating absorbs the tetra-ethyl binder of the investment material where that material is like the investment material disclosed in my copending application, Serial No. 48,071, filed November 4, 1935.

Instead of making this coating of the material above described, it may be made by mixing about ten to twenty parts water to one part silicate of soda and powdered flint to make a paste that may be sprayed upon the pattern or otherwise applied as a coating thereto as by painting the same on the pattern, or it may comprise a hydrolyzing binder composed of tetra-ethyl silicate approximately 50%, alcohol approximately 40%, and water approximately 10%. The actual procedure of hydrolyzing the tetra-ethyl silicate is generally as follows: First take the 50 parts by volume of tetra-ethyl silicate, add the 40 parts of alcohol, and shake thoroughly. Then add the 10 parts by volume of water slightly acidulated with approximately .007% of hydrochloric acid. This forms a setting binder to which powdered flint is added to make a paste. Powdered asbestos may be added to this latter coating in amount to give it the desired plasticity so that it may be sprayed or otherwise applied.

In making up the coating, clay, or any other highly refractory material which will not combine with the fused porcelain and which is finer than the rough outer investment material, may be used with or in lieu of the flint content of the coating.

The coated pattern with the teeth set therein is then invested in an investment ring in a way that the sprue end stands out of the investment. Several investments may be used, as set forth in my copending application, Serial No. 48,071, filed November 4, 1935.

After the investment is set, the wax is eliminated by heating. The porcelain, in powder or rock form, is inserted in the opening left by the sprue. If more than one shade of porcelain in the denture or denture part is required, the combination of the desired color porcelain may be inserted in the sprue in the order and amount to produce the desired effect of shade variety of denture or denture part. The mold is then placed in the furnace and the heat is increased to the flow point of the porcelain and preferably to a temperature below the normal fusing point of the porcelain, as more fully set forth in my copending application, Ser. No. 59,816, filed January 20, 1936, and, simultaneously with the application of such heat, the porcelain is pressed slowly and continuously into the mold cavity to fill said cavity, all as more fully described in my copending application above identified. The pressure may be applied by means of a refractory plug pushed down by a metal or refractory rod. After all of the porcelain is pressed into the mold cavity, the mold is permitted to cool, the refractory material is removed, and the plate may be colored to suit requirements, as, for example, by a coating of porcelain pink enamel. If the teeth 7 are molded as a unitary part of the porcelain plate part 5, they may be stained to the desired shades.

Instead of placing all of the porcelain in the gate and filling the mold by pressing the porcelain from the gate into the mold cavity, it is possible to do it somewhat differently, namely, to grind up the porcelain to fairly fine fragments, make a paste of it with water or alcohol, and then to vibrate it down into the mold cavity so as substantially to fill it. Additional porcelain is placed in the gate. The whole assembly is placed in the furnace and the procedure from then on is as above described. The difference is that only the amount of porcelain necessary to complete the filling of the mold cavity is fed in from the gate by the process previously described.

After the porcelain plate part 5 and metal base 6 have been formed and accurately finished as above described, these parts are assembled with a layer 10 of binding material therebetween for the purpose of uniting or joining the parts together to form a unitary laminated plate structure.

The intermediate layer 10 may be of any dental cement, preferably a cement not attacked by mouth acids and suitable to afford a good bond between the porcelain and the metal. This bonding material is preferably a somewhat elastic material to relieve the porcelain of stresses resulting from different thermal expansion and contraction between the metal and porcelain. The porcelain teeth, the porcelain gum part, the metal base, and the cementing material should preferably all have a similar co-efficient of expansion.

Other cements or bonding materials, such as "Bakelite" cement, may be employed within the scope of the present invention. This bonding layer 10 may be of still other materials, such as vulcanized dental rubber, a thin layer of Celluloid, a cement of colloidal rubber vulcanized in place, a high fusing wax, a synthetic resin cured in place, such as the phenol-formaldehyde casting type (such as Marblette), a combination of phenol-formaldehyde and gum rubber (Stryker type), a thermo-plastic resin such as polystyrol, or other suitable or equivalent materials.

I do not intend to be limited to the precise details shown or described.

I claim:

1. As a new article of manufacture, a dental plate comprising a layer of porcelain, a thin metal plate embodying a high degree of rigidity as measured by modulus of elasticity approaching that of porcelain, and a binder between said layer of porcelain and said metal plate and effective to secure same together.

2. As a new article of manufacture, a dental plate comprising a layer of porcelain, a thin metal plate embodying a high degree of rigidity as measured by modulus of elasticity, and a binder between said layer of porcelain and said metal plate and effective to secure same together, said binder being of somewhat elastic character to relieve the porcelain of stresses resulting from differing thermal expansion and contraction between the layer of porcelain and the metal plate.

3. As a new article of manufacture, a dental plate comprising a layer of porcelain, a layer of metal covering and joined to one side of said porcelain layer, and an additional substance comprising a cement formed from a condensation product joining said porcelain and metal layers and characterized in that it absorbs stresses due to differences in coefficients of expansion between said porcelain and metal layers.

4. The method of forming a dental plate characterized by having a metal backing plate, which comprises swaging the metal plate to the desired form, articulating a dental plate pattern to conform to said metal plate, forming an investment mold from such pattern, packing said mold with porcelain and heating the same to flow the porcelain into the mold, and subsequently introducing cement of a character such as to relieve differential expansion stresses tending to separate said plates between said plates for independently binding the metal plate to the porcelain plate in overlying palatal relation.

5. As a new article of manufacture, a dental plate comprising a layer of porcelain having a tooth part thereon, a metal plate, and an independent cementing material of resilient and adhesive character between said porcelain layer and said metal plate and effective to secure same together and to relieve the porcelain of stresses resulting from differing thermal expansion and contraction between the layer of porcelain and the metal plate.

REINER W. ERDLE.